United States Patent [19]

Furukawa

[11] 4,417,255

[45] Nov. 22, 1983

[54] INK-JET PRINTER

[75] Inventor: Isokazu Furukawa, Sagamihara, Japan

[73] Assignee: Ricoh Company, Ltd., Japan

[21] Appl. No.: 294,142

[22] Filed: Aug. 19, 1981

[30] Foreign Application Priority Data

Aug. 20, 1980 [JP] Japan ............ 55-114293

[51] Int. Cl.[3] ............ G01D 15/18

[52] U.S. Cl. ............ 346/75

[58] Field of Search ............ 346/1.1, 75, 140

[56] References Cited

U.S. PATENT DOCUMENTS

| | | | |
|---|---|---|---|
| 3,281,859 | 10/1966 | Stone | 346/75 |
| 3,683,396 | 8/1972 | Keur et al. | 346/140 IJ |
| 3,972,474 | 8/1976 | Keur | 346/75 X |
| 4,107,698 | 8/1978 | Galetto et al. | 346/75 |
| 4,336,544 | 6/1982 | Donald et al. | 346/1.1 |
| 4,350,986 | 9/1982 | Yamada | 346/75 |

*Primary Examiner*—Donald A. Griffin

*Attorney, Agent, or Firm*—Guy W. Shoup; Eliot S. Gerber

[57] ABSTRACT

An ink-jet printer for forming desired characters on a recording medium by ink droplets is provided. In accordance with the present ink-jet printer, the third harmonic vibration as well as the fundamental harmonic vibration is imparted to the ink inside the ink nozzle so that ink droplets regularly spaced from each other without ink satellites therebetween may be produced. One embodiment of the present invention proposes to provide a vibrator having a resonant frequency three times higher than the exciting frequency. Another embodiment of the present invention proposes to mount the vibrator on the nozzle at a specific location with respect to the mouth of the nozzle.

9 Claims, 4 Drawing Figures

INK-JET PRINTER

BACKGROUND OF THE INVENTION

1. Field of the Invention

The present invention relates to an ink-jet printer, and more in particular, the present invention relates to improvements in imparting vibration to the ink inside the ink nozzle of an ink-jet printer.

2. Description of the Prior Art

An ink-jet printer is a non-impact type printer and it includes an ink nozzle from which ink droplets are discharged under electrostatic acceleration to be impinged, after suitable deflection, upon a recording medium in a dot-matrix format to form characters thereon. In such an ink-jet printer, it has been well known to pressurize and impart vibration to the ink inside the nozzle in order to product desired ink droplets. In prior art ink-jet printers, use was made of an electrostrictive vibrator to impart vibration to the ink inside the nozzle. There were two conventional approaches in driving such as electrostrictive vibrator. One approach was the resonant method in which the frequency of the driving electrical signal was made equal to the resonant frequency of an electrostrictive vibrator; the other approach was the non-resonant method in which the two frequencies were set differently so as not to establish a particular relationship therebetween.

It is true that the conventional resonant method is high in vibrating efficiency, but it is extremely unstable since the resulting output drastically changes due to slight changes in external conditions or the like. The non-resonant method is quite opposite to the resonant method and unstability such as described above does not exist. However, the vibrating efficiency of the non-resonant method tends to be low and therefore it is required to provide a high power vibrator. Another approach has been proposed to apply a driving electrical signal having a modified waveform to the electrostrictive vibrator in order to prevent production of unwanted ink satellites between ink droplets to be used for forming characters on a recording medium. Although this last approach is effective in preventing production of unwanted ink satellites, an optimum waveform of the driving electrical signal must be determined in consideration of structual elements such as the electrostrictive vibrator and the liquid chamber of the ink nozzle. Determination of such an optimum waveform is quite difficult. Besides, it requires to provide an oscillating circuit of complicated structure, which, in turn, pushes up the manufacturing cost.

SUMMARY OF THE INVENTION

The disadvantages of the prior art are overcome with the present invention and an improved ink-jet printer is provided.

Preferably, the advantages of the present invention are attained by providing an ink-jet printer comprising an ink nozzle; ink supply means for supplying ink to said nozzle; vibrating means mounted on said nozzle for imparting vibration to the ink contained in said nozzle, said vibrating means having the resonant frequency of $3f_o$; and driving means for driving said vibrating means with a driving signal having frequency $f_o$. The vibrating means may include an electrostrictive, magnetostrictive or piezoelectric vibrator.

In accordance with another aspect of the present invention, there is provided an ink-jet printer which comprises an ink nozzle; ink supply means for supplying ink to said nozzle; vibrating means mounted on said nozzle for imparting vibration to the ink contained in said nozzle; and driving means for driving said vibrating means with a driving signal having frequency $f_o$, whereby said vibrating means is mounted on said nozzle such that the distance between the mouth of said nozzle and the front end of said vibrating means satisfies the condition of $(\lambda/12)(n+1)$ where $\lambda$ is the wavelength corresponding to the frequency $f_o$ and n is a positive integer number. With such a structure, a standing wave having frequency $3f_o$ is formed in the ink inside the ink nozzle.

In accordance with a further aspect of the present invention, additional vibrating means is mounted on the nozzle such that the distance between the mouth of the nozzle and the front end of the additional vibrating means satisfies the condition of $(\lambda/4)(n+1)$. With such a structure, the third harmonic wave is induced by the first vibrating means and the fundamental harmonic wave is induced by the additional vibrating means.

It is therefore an object of the present invention to provide an improved ink-jet printer which does not produce ink satellites between ink droplets.

Another object of the present invention is to provide an ink-jet printer which is not susceptible to changes in external and/or internal conditions.

A further object of the present invention is to provide an ink-jet printer which is simple in structure and therefore easy to manufacture.

Other objects, advantages and novel features of the present invention will become apparent from the following detailed description of the invention when considered in conjunction with the accompanying drawings.

DESCRIPTION OF THE PREFERRED EMBODIMENTS

Figure 1:
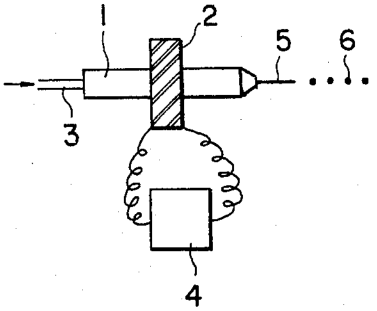
FIG. 1 is a schematic illustration showing one embodiment of the present invention.

FIG. 1 shows main components of the present ink-jet printer and, as shown, it comprises an ink nozzle 1, an electrostrictive vibrator 2 mounted on the nozzle 1, an ink supply line 3 for supplying ink to the nozzle 1, and a driving or oscillator circuit 4 for supplying a driving signal to the vibrator 2. An ink column 5 is formed extending from the mouth of the nozzle 1 into the forward direction over a certain distance, and ink droplets 6 are formed as separated from the ink column 5. Although not shown, it is preferable to connect a pressure source to the ink supply line 3 so that ink may be supplied to the nozzle 1 under pressure. It should also be noted that other elements such as charging and deflection electrodes are disposed along the trajectory of the moving ink droplets 6, though they are not shown. A character generator (not shown) is connected to the deflection electrodes (not shown) so that the ink droplets 6 form a desired character when they impinge upon a recording medium (not shown) positioned opposite to the nozzle 1.

When the vibrator 2 is driven by the oscillator circuit 4, ultrasonic vibration is imparted to the ink column 5 as well as the ink inside the nozzle 1. Depending upon the frequency of the high-frequency driving signal applied to the vibrator 2, ink droplets 6 are regularly formed as separated from the ink column 5. If the level of the driving signal is low, ink satellites are formed between ink droplets 6. The higher the level of the ultrasonic vibration, the higher the velocity of the ink droplets 6 and ink satellites disappear, thereby forming a non-satellite region. Such ink satellites are believed to be produced by distortion of ink liquid due to the application of vibration.

Figure 2:
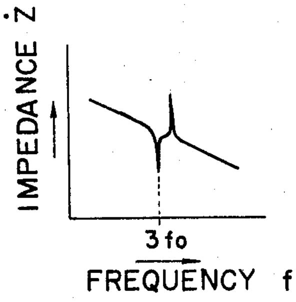
FIG. 2 is a graph showing impedance characteristics of the vibrator to be used in the present ink-jet printer.

Thus, in accordance with the present invention, there is provided an ink-jet printer which is capable of applying a composite vibration including the vibrating fundamental harmonic wave and its third harmonic wave to the ink inside the nozzle 1 with a simple structure to avoid the production of ink satellites as much as possible. FIG. 1 shows one embodiment of the present invention, and the electrostrictive vibrator 2 has a resonant frequency at $3f_o$ as shown in FIG. 2. Here, $f_o$ is the frequency of the driving signal supplied to the vibrator 2. The electrostrictive vibrator 2 has a frequency constant expressed by $K \cdot H_Z \cdot m$, and, therefore, we can define a value d as follows:

$$d = \frac{K \cdot H_Z \cdot m}{3f_o}.$$

In the case of the longitudinal vibration as shown in FIG. 1, the vibrator 2 may be resonated at the frequency which is three times higher than the frequency of the driving signal by setting the thickness of the vibrator 2 in the lengthwise direction of the nozzle 1 to be d. On the other hand, in the case of the radial vibration, the thickness of the vibrator 2 in the radial direction, which is normal to the lengthwise direction of the nozzle 1, should be set to d. With such a structure, even if a driving signal having a frequency which is not the resonant frequency but in the neighborhood thereof is applied, the vibrator 2 vibrates at the resonant frequency as well and, therefore, a composite vibration which includes the third harmonic component may be easily imparted to the ink.

Figure 3:
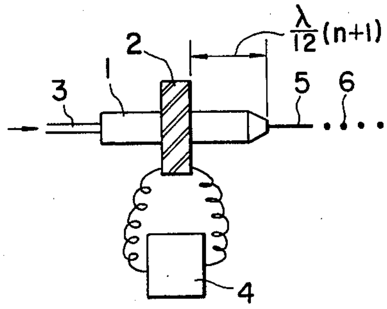
FIG. 3 is a schematic illustration showing another embodiment of the present invention.

FIG. 3 shows another embodiment of the present invention wherein the vibrator 2 is mounted on the nozzle 1 at a specific location with respect to the mouth of the nozzle 1. That is, as shown in FIG. 3, the distance between the front end surface of the vibrator 2 and the mouth of the nozzle 1 is determined to satisfy the condition of $$\frac{\lambda/3}{4}(n+1)$$

where n is a positive integer number. In other words, selection of such a particular distance between the front end of the vibrator 2 and the mouth of the nozzle 1 allows to form a standing wave having the frequency of $3f_o$ and thus the wavelength of $\lambda/3$ in the ink inside the nozzle 1. Accordingly, this embodiment may be considered as one example of a mechanical resonant system and similar advantages as those of the previous embodiment shown in FIG. 1 can be attained.

Figure 4:
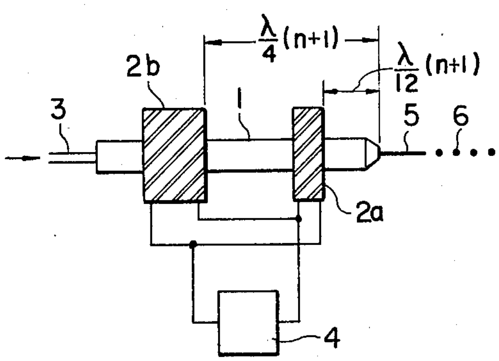
FIG. 4 is a schematic illustration showing a further embodiment of the present invention.

FIG. 4 shows a further embodiment of the present invention in which two vibrators *2a* and *2b* are mounted on the nozzle 1 at specific locations, respectively. As may be seen easily, the vibrator *2a* in FIG. 4 corresponds to the vibrator 2 in FIG. 3 so that the vibrator *2a* is located at the distance of $(\lambda/12)(n+1)$ away from the mouth of the nozzle 1. The vibrator *2b* is an additional vibrator which is mounted on the nozzle 1 at the distance of $(\lambda/4)(n+1)$ away from the mouth of the nozzle 1 as shown. The driving circuit 4 is connected to both of the vibrators *2a* and *2b* and, therefore, these two vibrators are driven by the same driving signal having frequency $f_o$. As may be easily understood, the vibration imparted by the vibrator *2b* produces a standing wave comprised of the fundamental harmonic component in the ink inside the nozzle 1; whereas, the vibrator *2a* imparts vibration to produce a standing wave comprised of the third harmonic component.

It is to be noted that, also in the embodiment shown in FIG. 4, properties of each of the vibrators *2a* and *2b* may be suitably selected to form a resonant system, if desired. Besides, the thickness of each of the vibrators *2a* and *2b* in the lengthwise or radial direction may be appropriately determined as previously discussed with reference to the embodiment shown in FIG. 1. Moreover, it may be easily understood that any combination of resonance, non-resonance and total resonance may be applied to the present invention. It should also be noted that the rate of containing the higher harmonic component in the composite vibrating waveform thus obtained may be easily and suitably adjusted by charging the material or the degree of coupling with the load.

While the above provides a full and complete disclosure of the preferred embodiments of the present invention, various modifications, alternate constructions and equivalents may be employed without departing from the true spirit and scope of the invention. For example, the vibrator 2 may be of the magnetostructive or piezoelectric type instead of the electrostrictive type. Therefore, the above description and illustration should not be construed as limiting the scope of the invention, which is defined by the appended claims.

What is claimed is:

1. An ink-jet printer for forming characters on a recording medium by ink droplets in a dot-matrix format comprising:
   - an ink nozzle;
   - ink supply means for supplying ink to said nozzle;
   - vibrating means mounted on said nozzle for imparting vibration to the ink contained in said nozzle, said vibrating means having the resonant frequency of $3f_o$; and
   - driving means for driving said vibrating means with a driving signal having frequency $f_o$.

2. The ink-jet printer of claim 1 wherein the thickness of said vibrating means in the lengthwise direction of said nozzle is set to the value obtained by dividing the frequency constant of said vibrating means by $3f_o$.

3. The ink-jet printer of claim 1 wherein the thickness of said vibrating means in the radial direction of the lengthwise direction of said nozzle is set to the value obtained by dividing the frequency constant of said vibrating means by $3f_o$.

4. The ink-jet printer of claim 1 wherein said vibrating means comprises an electrostrictive vibrator.

5. The ink-jet printer of claim 1 wherein said vibrating means comprises a magnetostrictive vibrator.

6. The ink-jet printer of claim 1 wherein said vibrating means comprises a piezoelectric vibrator.

7. An ink-jet printer for forming characters on a recording medium by ink droplets in a dot-matrix format comprising:

an ink nozzle;

ink supply means for supplying ink to said nozzle;

vibrating means mounted on said nozzle for imparting vibration to the ink contained in said nozzle; and driving means for driving said vibrating means with a driving signal having frequency $f_o$, whereby said vibrating means is mounted on said nozzle such that the distance between the mouth of said nozzle and the front end surface of said vibrating means satisfies the condition of $(\lambda/12)(n+1)$ where $\lambda$ is the wavelength corresponding to the frequency $f_o$ and n is a positive integer number.

8. The ink-jet printer of claim 7 further comprising additional vibrating means mounted on said nozzle such that the distance between the mouth of said nozzle and the frond end surface of said additional vibrating means satisfies the condition of $(\lambda/4)(n+1)$.

9. The ink-jet printer of claim 8 wherein said driving means is commonly used to drive said two vibrating means.

* * * * *